Oct. 26, 1943.   J. H. F. STEWART   2,332,763
PACKING FOR PISTON, SHAFT, AND THE LIKE
Filed June 9, 1941
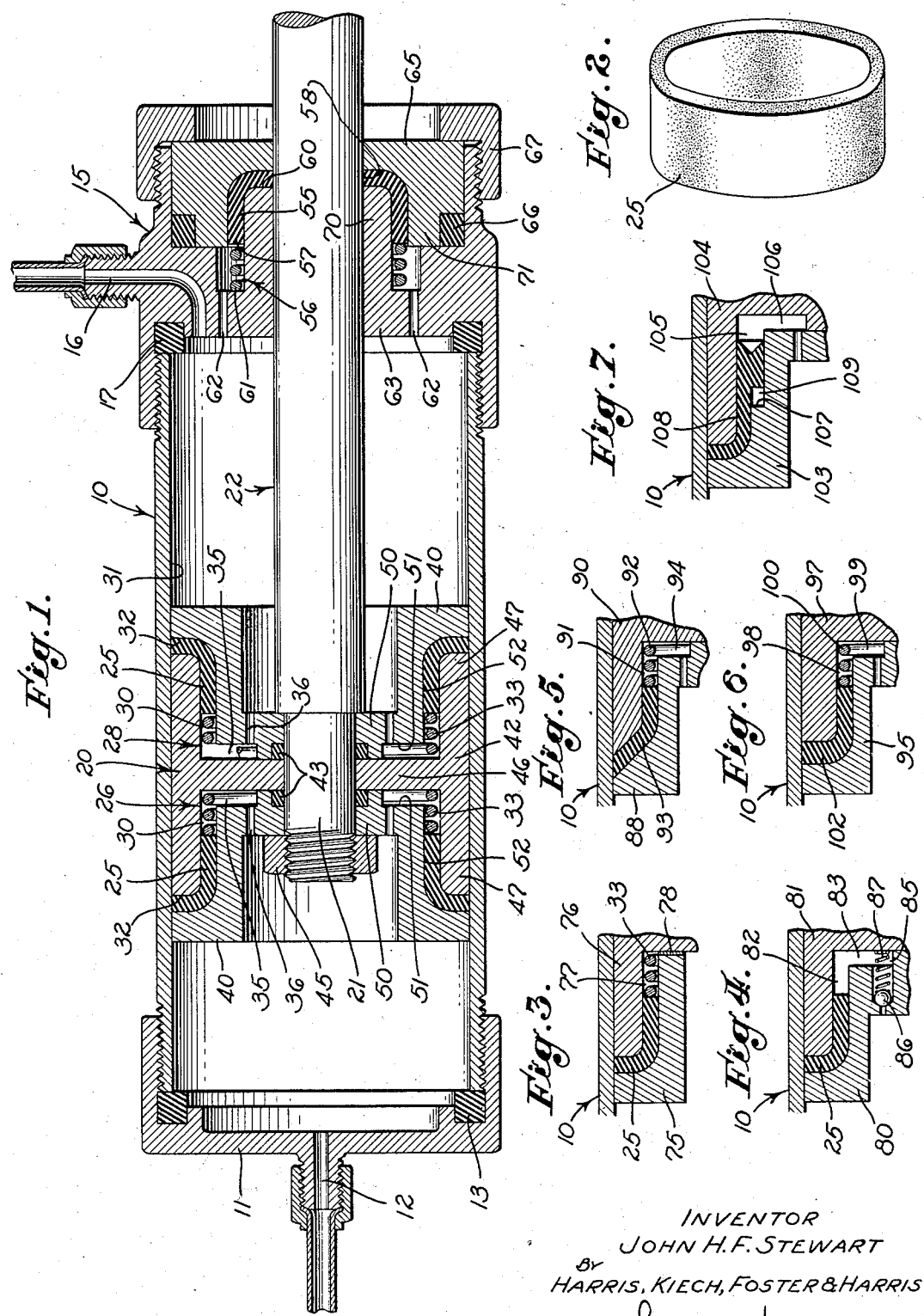
INVENTOR
JOHN H. F. STEWART
BY
HARRIS, KIECH, FOSTER & HARRIS
ATTORNEYS.

Patented Oct. 26, 1943

2,332,763

UNITED STATES PATENT OFFICE 2,332,763

PACKING FOR PISTONS, SHAFTS, AND THE LIKE

John H. F. Stewart, Pasadena, Calif.

Application June 9, 1941, Serial No. 397,245

11 Claims. (Cl. 309—4)

My invention relates to packing means for sealing joints and relatively movable surfaces against fluid flow. While the invention is broadly applicable in various fields, it has special utility in packing relatively movable parts in hydraulic systems, and I elect to describe the invention as embodied in a hydraulic cylinder for packing a piston and an associated piston rod. To those skilled in the art such a disclosure will be adequate guidance for applying the invention to rotating as well as to sliding members wherever it may have utility.

It is an object of the invention to provide an efficient packing that is adapted to maintain its effectiveness over long periods of service. More specifically, one purpose of the invention is to provide a packing that is automatically advanced towards a sealing zone to compensate for progressive wear at the sealing zone.

An object in one practice of the invention is to make such a packing responsive to pressure of the fluid that is cut off by the packing whereby the sealing pressure exerted by the packing increases automatically whenever a rise in fluid pressure occurs, and, on the other hand, decreases with consequent reduction in friction and wear whenever the opposed fluid pressure drops. In another practice of the invention one object is to maintain packing efficiency by fluid pressure during drops in the source pressure.

The invention is characterized by the concept of providing a packing sleeve concentric to a cylindrical surface against which a seal is to be effected, providing a guide wall to divert an end of the sleeve against the cylindrical surface, and urging the sleeve longitudinally towards said guide wall to create sealing pressure at the cylindrical surface. One object of the invention is to provide a structure forming a suitable packing chamber for carrying out this conception. Another object is to make suitable provision for urging the sleeve into sealing contact with the cylindrical surface, such provision including mechanical means as well as fluid-pressure means. In some practices of the invention it is my purpose to design the packing arrangement for a differential action to favor either relatively high or relatively low pressure at the sealing zone. These and other objects of the invention will be apparent from my detailed description to follow, taken with the accompanying drawing.

In the drawing which is to be considered as illustrative only:

Fig. 1 is a longitudinal section through a hydraulic cylinder incorporating my invention;

Fig. 2 is a perspective view on a reduced scale of a packing sleeve employed in the practice of the invention; and Figs. 3 to 7 are fragmentary sectional views illustrating modified forms of the invention.

In the drawing a hydraulic cylinder 10 is closed at one end by a plain head 11 that has a fluid port 12 and is equipped with a suitable sealing gasket 13. Closing the other end of the cylinder is a packing head generally designated 15 providing a fluid port 16 and equipped with a second sealing gasket 17. Inside the cylinder 10 is a cooperating piston generally designated 20 that is mounted on a reduced end portion 21 of a piston rod 22, the piston rod extending through the packing head 15. Such a cylinder and piston may comprise, for example, a fluid-responsive device in which the piston is reciprocated by fluid pressure, each of the two ports 12 and 16 serving sometimes as an inlet port and at other times as a discharge port.

Since the piston is subject to fluid from each side alternately it may be provided with two packing units each responsive to fluid pressure from one face of the piston. Thus Fig. 1 shows a packing sleeve 25 in a left packing chamber generally designated 26 and a second packing sleeve 25 in a right packing chamber generally designated 28. Each of the packing chambers 26 and 28 is annular in configuration and has what may be termed a main portion 30 concentrically spaced from the inner surface 31 of the hydraulic cylinder and what may be termed a terminal portion 32 that is turned towards the inner surface 31 of the hydraulic cylinder.

In the particular construction shown in Fig. 1 the main portion 30 is substantially uniform in diameter, being in longitudinal cross section substantially parallel to the inner surface 31 of the cylinder. While this configuration is preferred, it may be departed from in various practices of the invention. The terminal portion 32 of each packing chamber is preferably substantially radial in disposition so that as viewed in longitudinal section, it is perpendicular to the inner surface 31 of the hydraulic cylinder, but it is to be understood that the terminal portion 32 may meet the hydraulic cylinder at various angles in various practices of the invention.

Each of the packing cylinders 26 and 28 is preferably formed by smooth walls and the transition from the main portion 30 to the terminal portion 32 of each chamber is such as to incur relatively little resistance to longitudinal movement of the packing sleeve 25 into the terminal portion. In other words, each of the packing chambers provides guiding surfaces to divert the packing sleeve against the cylinder wall with minimum impedance to longitudinal movement of the packing sleeve.

Each of the packing sleeves 25 may be made of any suitable material that is sufficiently deformable to follow the changing configuration of a packing chamber. I prefer to fabricate the packing sleeves from suitable resilient material such as rubber and the like.

In the arrangement shown in the drawing, a suitable yielding means is provided in each packing chamber 26 and 28 to urge the corresponding packing sleeve 25 continuously into the terminal portion 32 of the packing chamber, the yielding means in the present embodiment being a helical spring 33 in compression against one end of the packing sleeve. The packing arrangement also includes suitable passage means for transmitting fluid pressure from each side of the piston 20 to the corresponding packing chamber 26 or 28 to act against the end of the packing sleeve in cooperation with the spring 33 to urge the packing sleeve into sealing contact with the surrounding wall of the hydraulic cylinder. In the construction shown, a radial passage 35 extends inwardly from each of the packing chambers and communicates with one or more longitudinal bores 36 to the corresponding face of the piston.

The piston 20 may be of any suitable structure to provide the described arrangement. By way of example, I show the piston as comprising two end bodies 40, a central body 42, and a pair of intervening packing rings 43, the assembled piston being retained on the piston rod 22 by a suitable nut 45. The central body 42 has a central radial web 46 and two cylindrical portions 47 extending in opposite directions therefrom. Each of the cylindrical portions 47 constitutes the first of two walls forming each of the packing chambers 26 and 28. Each of the end bodies 40 has a hub portion 50 abutting the central web 46 and has a radial portion 51 spaced from the central web to form the previously mentioned radial passage 35. Each of the end bodies 40 has an annular portion 52 that is complementary to the corresponding cylindrical portion 47 of the central body 42, and it is apparent that each of the annular portions 52 provides the second of the two walls for defining each of the packing chambers 26 and 28. Each of these annular portions 52 is embraced both by the corresponding packing sleeve 25 and by the corresponding spring 33.

Each of the springs 33 continuously urges the associated packing sleeve 25 longitudinally and causes the packing sleeve to be automatically advanced as the sealing end of the sleeve is progressively worn away in service. Fluid pressure from within the hydraulic cylinder 10 acts against the end of the packing sleeve in cooperation with the spring whenever fluid pressure occurs on the corresponding side of the piston. Communication for the transmission of such fluid pressure to the end of a sleeve 25 is afforded by the longitudinal bores 36 and the radial bores 35. The fact that the sealing pressure of each packing sleeve drops when the fluid pressure on the corresponding side of the piston drops is of importance in avoiding excessive wear and in avoiding excessive friction. Normally only one of the two packing sleeves is under working pressure at a time.

In one contemplated practice of my invention, each of the packing sleeves 25 is oversize in relation to the dimensions of the corresponding packing chamber, it being necessary to crowd the packing sleeve somewhat into contracted diameter in assembling the structure. Thus, the inherent unrestrained diameter of the elastic sleeve in the free state shown on a reduced scale in Fig. 2 is larger than the diameter of the packing chamber into which the sleeve is to be inserted. In such an arrangement the sleeve when installed has a desirable tendency to expand into the terminal portion of the packing chamber and this tendency created in designing the sleeve and the associated members may be so pronounced as to serve the function of a spring, in which event the spring 33 may be omitted.

The packing head 15 is provided with a similar packing sleeve 55 to function in the previously described manner in a packing chamber generally designated 56. The packing chamber 56 has a main portion 57 in concentric, spaced relation to the peripheral surface 58 of the piston rod 22 and has a terminal portion 60 that turns inward to the surface of the piston rod. The packing sleeve 55 is urged towards the terminal portion 60 of the packing chamber by a suitable spring 61, and fluid pressure may likewise act on the packing sleeve by virtue of one or more bores 62 through the packing head from the interior of the hydraulic cylinder to the packing chamber.

In the particular construction shown in the drawing, the packing head 15 comprises two annular bodies 63 and 65 and a cooperating sealing ring 66, the two bodies being held together by a suitable bushing 67. The body 63 has a cylindrical portion 70 providing the first of two walls for forming the packing chamber 56 and the body 65 has a complementary annular portion 71 to serve as the second wall of the packing chamber.

Here again, the packing sleeve 55 may have an inherent unrestrained diameter different from the diameter of the corresponding packing chamber 56 to create a desirable tendency for the packing sleeve to creep towards the surface 58 of the piston rod. The unrestrained diameter of the packing sleeve 55 when outside the chamber is, of course, smaller than the diameter of the main portion 57 of the packing chamber and may be as small in diameter or smaller than the surface 58 of the piston rod. Here again, the tendency of such a packing sleeve to contract by virtue of its elasticity may be so pronounced as to make the spring 61 unnecessary.

In practice it has been found that my invention may be substituted with outstanding advantages for so-called chevron packing in high pressure hydraulic systems. Chevron packing, which consists of V-shaped layers of suitable material, has been widely employed in hydraulic cylinders for actuating landing gear and other mechanism on aircraft. If such a cylinder equipped with chevron packing is stored or transported in fully assembled state, the chevron packing carried by the piston tends to settle away from the uppermost walls with fatal loss in sealing efficiency. Notwithstanding precautions to insure upright position of the cylinders until they are actually installed, cylinders are sometimes left in horizontal position for substantial periods of time and the resultant destruction of the fluid seal is not discovered until the device fails in service. In some installations the same type of failure occurs over a period of time because of side thrust on the piston rod tending to force the piston in a lateral direction against the surrounding cylinder. The present invention, however, is wholly immune to such difficulties. A high pressure hydraulic cylinder such as shown in Fig. 1 may be stored in horizontal position over long periods of time without any loss in sealing efficiency.

Another advantage of the present invention over chevron packing is that close tolerance in dimensions is not required. In Fig. 1, for example, a clearance of .015 inch or more may exist between the piston and the cylinder or between the piston rod and the surrounding packing head without loss in efficiency. The various working parts may be formed with only ordinary care by conventional screw machines, for example. A sealing construction for incorporating conventional chevron packing, however, must be machined with close tolerance. If there is too little clearance, chevron packing has no sealing effect and, on the other hand, excessive clearance results in excessive sealing pressure.

Figs. 3 to 7 illustrate, by way of example, various modifications that may be made in the packing incorporated in the piston construction of Fig. 1.

In the arrangement shown in Fig. 3 the separate piston bodies 75 and 76 of the piston form a packing chamber 77 for a packing sleeve 25 and a suitable gasket 78 cuts off radial flow of fluid into the packing chamber. It is contemplated that the sealing action against the surrounding cylinder 10 will be provided primarily by a helical spring 33 with substantially no assistance by fluid pressure.

In the arrangement shown in Fig. 4 the sealing pressure against the surrounding cylinder 10 is primarily derived from fluid pressure, there being no spring pressure whatsoever against the inner end of the packing. In Fig. 4 the separate piston bodies 80 and 81 form a packing chamber 82 for a packing sleeve 25 and also form a fluid pressure passage 83. The fluid pressure passage 83 includes a longitudinal bore 85 that provides a seat for a check valve in the form of a ball 86 with a cooperating spring 87. The object of this particular construction is not only to provide fluid pressure to act against the end of the packing sleeve, but also to provide for maintaining that fluid pressure when the fluid pressure in the cylinder drops. The check valve tends to maintain the sealing pressure at the maximum value of the working pressure in the cylinder.

In Fig. 5 piston bodies 88 and 90 form a packing chamber 91 in which a spring 92 presses against the end of a packing sleeve 93 in cooperation with fluid pressure admitted through a passage 94. The packing chamber 91 differs from the corresponding packing chamber 26 in Fig. 1 in that it is conical in general configuration to meet the surrounding cylinder 10 at an acute angle. One feature of this particular arrangement is that a wedging action favorable to sealing efficiency is produced by the crowding of the packing sleeve into the sealing zone, and a second feature is that what may be termed a lip action is provided, i. e. working fluid encountered by the leading inclined edge of the packing sleeve tends to press the packing sleeve against the surrounding cylinder.

In Fig. 6 piston bodies 95 and 97 form a packing chamber 98 into which fluid is admitted through a passage 99 and in which a spring 100 presses against the end of a packing sleeve 102. This particular arrangement differs from the corresponding arrangement in Fig. 1 only in the fact that both the packing chamber 98 and the complementary packing sleeve 102 increase in thickness towards the sealing zone. In comparison with Fig. 1 the arrangement indicated by Fig. 6 provides a large area of sealing contact on the part of the packing sleeve relative to the end area of the packing sleeve subjected to fluid pressure from the passage 99 and consequently a differential is provided in favor of relatively low sealing pressure per unit area of sealing contact with the surrounding cylinder 10. Such an arrangement may be desirable to avoid excessive sealing pressure when exceedingly high working pressures are involved.

In Fig. 7 piston bodies 103 and 104 form a packing chamber 105 having a fluid pressure passage 106. The end portion of the packing chamber 105 that communicates with the fluid passage 106 is relatively wide in cross section but the opposite end portion of the passage leading to the surrounding cylinder 10 is relatively narrow in cross section, the change in configuration providing an annular shoulder 107. The packing sleeve 108 in the packing chamber 105 is correspondingly thin at its leading end and correspondingly thick at its trailing end. As indicated in the drawing, the trailing end is cut away to a V-shape in cross section to provide a spreading action in response to pressure from the passage 106. The drawing shows a small space or gap 109 at the face of the shoulder 107, but it is contemplated that the gap will disappear under any substantial pressure from the passage 106, and it is further contemplated that the material of the packing sleeve will, in effect, flow past the shoulder 107 as required to maintain sealing efficiency. It is apparent that Fig. 7 provides a differential action opposite from that provided by the arrangement in Fig. 6. The arrangement of Fig. 7 favors relatively high sealing pressure per unit of area of sealing contact for a given pressure exerted through the passage 106 and will be of special utility for maintaining effective sealing action with relatively low pressures.

Within the scope of my underlying concept various changes and modifications may be made without departing from the essence of the invention, and I specifically reserve the right to all such changes and modifications that properly come within the scope of my appended claims.

I claim as my invention:

1. In a device for forming a fluid seal between first and second telescoped relatively moving cylindrical surfaces, the combination of: a substantially tubular preformed resilient sleeve of a configuration open at both ends, said sleeve being axially aligned with said cylindrical surfaces; means for retaining said sleeve relative to said first surface and guiding one end thereof into sealing engagement with said second surface; and actuating means exerting pressure against the opposite end of said sleeve for moving said sleeve axially relative to said first surface to cause said one end of said sleeve to move into sealing engagement with said second surface.

2. In a device for forming a fluid seal between first and second telescoped relatively moving cylindrical surfaces, the combination of: a substantially tubular preformed resilient sleeve axially aligned with said cylindrical surfaces; means contacting both the inner and the outer surfaces of said sleeve at one end thereof for retaining said sleeve relative to said first surface and guiding the other end thereof into sealing engagement with said second surface; and fluid actuating means effective against said one end for moving said sleeve axially relative to said first surface to cause said other end of said sleeve to move into sealing engagement with said second surface.

3. In a device for forming a fluid seal between first and second telescoped relatively moving cylindrical surfaces, the combination of: a substantially tubular resilient sleeve axially aligned with said cylindrical surfaces; means for retaining said sleeve relative to said first surface and guiding one end thereof into sealing engagement with said second surface; and actuating means for admitting fluid under pressure to the other end of said sleeve to cause said sleeve to move axially relative to said first surface to cause said one end of said sleeve to move into sealing engagement with said second surface.

4. In a device for forming a fluid seal between first and second telescoped relatively moving cylindrical surfaces, the combination of: a substantially tubular resilient sleeve axially aligned with said cylindrical surfaces; means for retaining said sleeve relative to said first surface and guiding one end thereof into sealing engagement with said second surface; and actuating means for moving said sleeve axially relative to said first surface to cause said one end of said sleeve to move into sealing engagement with said second surface, said actuating means including a port for admitting fluid under pressure into engagement with the other end of said sleeve and a spring engaging said other end of said sleeve.

5. In a device involving a body of fluid under pressure, means to form a circular seal against a given cylindrical surface, comprising in combination: a first member having a first cylindrical surface in moving contact with said given cylindrical surface; a second member having a second cylindrical surface in moving contact with said given cylindrical surface, said second cylindrical surface being spaced from said first cylindrical surface to define therewith an intervening circular sealing zone around said given cylindrical surface, said two members defining an annular packing chamber leading to said zone, said annular chamber having an annular portion substantially concentric to and spaced from said given cylindrical surface and an annular end at said zone; a deformable packing sleeve in said chamber surrounding part of one of said members in said main portion of the chamber and extending to said zone; and passage means to convey fluid under pressure from said body of fluid to said portion of the chamber to urge said packing sleeve towards said zone.

6. In a device involving a body of fluid under pressure, means to form a circular seal against a given cylindrical surface, comprising in combination: a first member having a first cylindrical surface in moving contact with said given cylindrical surface; a second member having a second cylindrical surface in moving contact with said given cylindrical surface, said second cylindrical surface being spaced from said first cylindrical surface to define therewith an intervening circular sealing zone around said given cylindrical surface, said two members defining an annular packing chamber leading to said zone, said annular chamber having an annular portion substantially concentric to and spaced from said given cylindrical surface and an annular end at said zone; a deformable packing sleeve in said chamber surrounding part of one of said members in said main portion of the chamber and extending to said zone; passage means to convey fluid under pressure from said body of fluid to said portion of the chamber to urge said packing sleeve towards said zone; and a check valve in said passage means to prevent return flow to said body of fluid and thereby maintain relatively high pressure against said packing sleeve when the pressure of said body of fluid drops.

7. In a fluid-pressure device, means to form a circular seal against a given cylindrical surface, comprising in combination: a first member having a first cylindrical surface in moving contact with said given cylindrical surface; a second member having a second cylindrical surface in moving contact with said given cylindrical surface, said second cylindrical surface being spaced from said first cylindrical surface to define therewith an intervening circular sealing zone around said given cylindrical surface, said two members defining an annular packing chamber leading to said zone, said annular chamber having a main annular portion concentric to and spaced from said given cylindrical surface and a terminal portion directed towards said zone; an elastic packing sleeve in said chamber surrounding part of one of said members in said main portion of the chamber and extending through said terminal portion of the chamber to said zone, said sleeve having an inherent unrestrained diameter that is closer to the diameter of said given cylindrical surface than is the diameter of said main portion of the chamber whereby the elasticity of the sleeve facilitates longitudinal movement of the sleeve out of said main portion of the chamber into said terminal portion of the chamber; and passage means to convey fluid under pressure to urge said packing sleeve towards said zone.

8. In a fluid-pressure device, means to form a circular seal against a given cylindrical surface, comprising in combination: a first member having a first cylindrical surface in moving contact with said given cylindrical surface; a second member having a second cylindrical surface in moving contact with said given cylindrical surface, said second cylindrical surface being spaced from said first cylindrical surface to define therewith an intervening circular sealing zone around said given cylindrical surface, said two members defining an annular packing chamber leading to said zone, said annular chamber having a main annular portion of substantially uniform diameter spaced concentrically from said given cylindrical surface, and a terminal portion directed towards said zone; a deformable packing sleeve in said chamber surrounding part of one of said members, said sleeve having a first end in said main portion of the chamber and having a second end in contact with said given cylindrical surface in said zone; passage means to convey fluid under pressure to said main portion of the chamber to urge said packing sleeve towards said zone; and yielding means in said main portion of the chamber pressing against said first end of the sleeve to urge the sleeve towards said zone.

9. In a fluid-pressure device, means to form a circular seal against a given cylindrical surface, comprising in combination: a first member having a first cylindrical surface in moving contact with said cylindrical surface; a second member having a second cylindrical surface in moving contact with said given cylindrical surface, said second cylindrical surface being spaced from said first cylindrical surface to define therewith an intervening circular sealing zone around said given cylindrical surface, said two members defining an annular packing chamber leading to said zone, said annular chamber having a main annular portion of substantially uniform diameter spaced concentrically from said given cylindrical surface, and a terminal portion directed towards said zone; a deformable packing sleeve in said chamber surrounding part of one of said members, said sleeve having a first end in said main portion of the chamber and having a second end in contact with said given cylindrical surface of said zone, said sleeve substantially throughout its length substantially filling the chamber in cross section; and passage means to convey fluid under pressure to said main portion of the chamber to act against said first end of the packing sleeve to urge the packing sleeve towards said zone.

10. A combination as set forth in claim 9 in which said first end of the sleeve subject to pressure from said passage means differs substantially in thickness from said second end of the sleeve to create a differential effect in transmitting and applying sealing pressure.

11. A packing means for a fluid-pressure device in which an inner means with an outer cylindrical surface is telescoped into an outer means with a complementary inner cylindrical surface, said packing means comprising: a first continuous wall provided by said outer means, said wall being in major part spaced from said inner surface and terminating adjacent said inner surface; a second continuous wall provided by said outer means in spaced relation to said first wall to define therewith a packing chamber leading to said inner surface; a preformed deformable packing sleeve in said chamber surrounding said first wall; yielding means in said chamber pressing against one end of said sleeve to urge the other end of said sleeve into contracted disposition in sealing contact with said inner surface; and passage means to admit fluid under pressure into said chamber to cooperate with said yielding means in urging said sleeve towards said inner slide surface.

JOHN H. F. STEWART.